June 10, 1941.  F. H. HATELY  2,245,475

FLUID SEAL

Filed April 21, 1939

INVENTOR
FURNESS HALL HATELY
BY
ATTORNEYS

Patented June 10, 1941

2,245,475

UNITED STATES PATENT OFFICE 2,245,475

FLUID SEAL

Furness Hall Hately, Greenwich, Conn., assignor to American Felt Company, New York, N. Y., a corporation of Massachusetts Application April 21, 1939, Serial No. 269,080

6 Claims. (Cl. 286—11)

The present invention relates to fluid seals of the type described and claimed in my copending application, Serial No. 249,567, filed January 6, 1939, and has for an object to provide an improved seal capable of effectively preventing oil, grease or other fluid from passing along a rotating shaft.

The invention has been developed in making a seal designed more particularly for use in machines wherein cutting oil or other liquid is used on one side of the seal for lubrication or cooling for a cutting operation and a lubricating oil is used on the opposite side of the seal for lubricating purposes and wherein it is desirable to maintain complete separation of said oils. Such a seal will be described for the purposes of illustrating the principles of the invention but it will be understood that such embodiment is illustrative merely and that seals embodying the invention are adaptable for retaining various fluids such as liquid chemicals and even vapors and other gases.

The invention aims to provide a seal between a shaft and a casing wall which will not be broken upon reasonable longitudinal or eccentric movement of the shaft.

It is an object of the invention to provide a seal which allows so exceedingly minute an escape of fluid along the shaft that for all practical purposes it may be considered perfectly tight. This condition may be called "effectively tight."

The invention provides in the preferred embodiment a seal wherein a member having opposite smooth annular bearing surfaces is engaged by two opposite flexible impervious annular members or diaphragms rotating against the smooth bearing surfaces to provide in each case an edge contact which in the initial unworn condition is substantially a line contact. This very narrow area of contact ordinarily will increase as the seal continues in use but this tends to reach a limit once a pressure lubrication equilibrium is obtained.

In the embodiment of the invention more particularly herein described for the purpose of illustrating the principles of the invention, the member providing the smooth bearing faces is the outer member and it is fixed within the casing. For convenience it is hereinafter referred to as the "race." The yieldable flexible impervious members engaging the bearing surfaces to provide fluid tight seals are carried by the rotating shaft and rotate therewith. It will be understood, however, that a reversal of arrangement of some or all of the elements is possible while retaining features of the invention.

It is preferable that the parts shall be so constructed and arranged that the contact between the flexible impervious members and the smooth bearing surfaces against which they rotate shall be at an edge of one part, preferably at the edge of the impervious members, as distinguished from an arrangement in which a side face of an impervious member bears against a smooth bearing face at a position spaced from the edges of both elements. Furthermore, it is advantageous that substantially a line contact be maintained, that is, a narrow contact between the edge of one member, preferably the flexible impervious member, and the face of the other member, as distinguished from an arrangement in which a wide face to face contact is provided.

If the contact is wider than one that could properly be called a line, or if it becomes so through use or plasticity, or both, it should at its widest still remain narrow enough to assure a relatively high specific pressure between the rubbing surfaces, and it should at least be a close contact immediately adjacent the edge, for example the square edge of the impervious member.

It has been found that a more perfect seal is obtained if the flexible impervious member in each case forms a slight angle with the smooth bearing face, for example an angle of at least 5 and preferably between 5 and 10 or perhaps 15°.

The impervious members should be formed of a material which meets several different requirements. It must be one which under the conditions of use will not roughen or unduly grind either itself or the race when rotated thereagainst for long periods and at the speeds and under the pressures of the particular use for which the seal is designed. It must resist the action of oil, grease and other fluids to which it is exposed and must withstand indefinitely the heat to which it is exposed.

As explained in applicant's copending application above mentioned, excellent results have been obtained with impervious members of fibrous material impregnated with phenolic condensation products. The material used in the seal shown is a laminated sheet structure of fine cotton or linen fabric impregnated and coated with Bakelite and sold under the trade-mark "Formica" by the Formica Insulating Company of Cincinnati, Ohio. This material consists of a linen base impregnated with phenol formaldehyde. Various other fibrous materials impregnated with resinous condensation products may be substituted as equivalents. The two sealing diaphragms and associated parts effectively prevent the flow of either fluid from its side of the seal to mix with the fluid on the other side and is adaptable for use with fluids of various characteristics. The seal may require diaphragms of different materials if the liquids differ.

The nature and objects of the invention will be better understood from a description of an illustrative embodiment thereof, for the purposes of which description reference should be had to the accompanying drawing forming a part hereof and in which—

Figure 1:
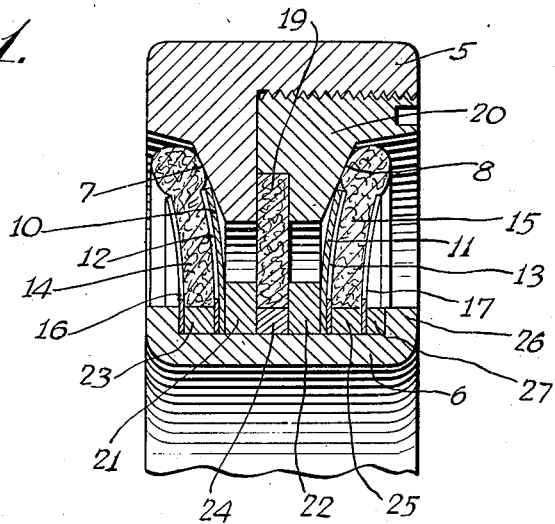
Figure 1 is a central sectional view of a seal embodying the principles of the invention.
Figure 2:
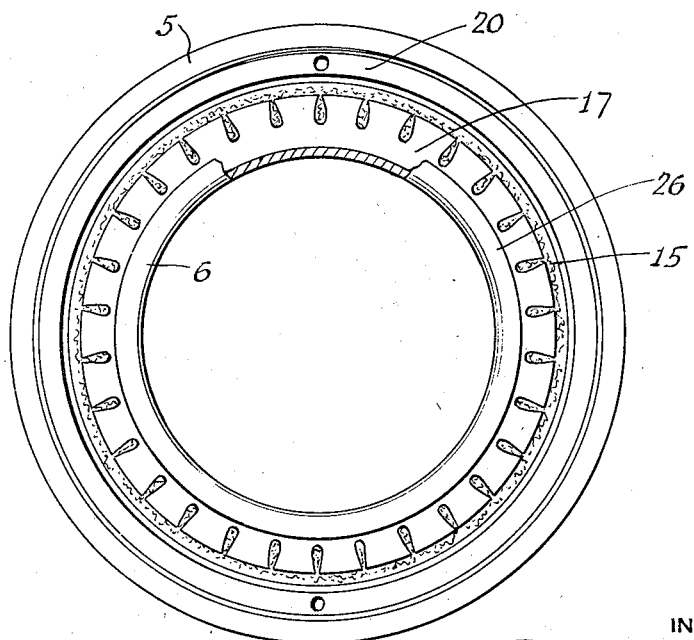
Fig. 2 is a side view of the same.

The seal herein shown comprises an outer member or race 5 which in use is fitted tightly within the wall of the casing to prevent any possible leakage of oil between the race and casing and an inner sleeve 6 designed to fit as tightly on a shaft which ordinarily is the rotating element. The race 5 of the arrangement shown is formed to present two opposite bearing faces 7 and 8. For convenience of description these bearing faces will be referred to as the right and left bearing faces according to their position in the drawing. The inner member or flanged sleeve 6 carries certain parts of the seal which rotate with the shaft. In order to prevent flow of oil or other fluid longitudinally of the shaft between the rotatable member 6 and the race 5, an arrangement of flexible members is provided whereby an effective, tight seal is maintained at all times whether the parts are relatively rotating or still. As shown, the left bearing face 7 is engaged by an impervious flexible disk or diaphragm 10 which is maintained yieldably in contact with the bearing face 7 thereby maintaining oil sealing contact even during slight relative longitudinal movement of the race and the sleeve and also maintaining contact during eccentric relative movements of these parts. The right bearing face 8 is engaged by a similar diaphragm 11 suitably maintained in contact to provide a similar seal.

The impervious diaphragms are cut from a sheet of Formica or equivalent material of a thickness of about 0.01 to 0.03 of an inch. A thickness of 0.015 to 0.020 of an inch for seals for shafts of the diameter of 1 to 8 inches is preferred. In cutting the diaphragms care is taken to insure a sharp continuous edge without nicks or blemishes for engagement with the bearing face, as distinguished from a roughly cut or rounded edge. It is to be noted that in the arrangement shown the area of contact between each bearing face of the race and the flexible diaphragm partakes of the nature of a line contact as contrasted with an extended face to face contact and it terminates sharply at the outer edge or corner of the diaphragm as contrasted with the condition which would obtain if the outer edge were rounded or irregular. Each of these two features contributes to the effectiveness of the seal. It is preferred that both features be embodied in the seal.

To provide an effective edge contact in the illustrated arrangement the angle of the bearing surfaces to the plane of the race is made between 18° and 22° and the resiliency of the impervious flexible diaphragm and of the means pressing the same against the bearing surfaces are such that the angle between each bearing surface and the engaging face of the diaphragm at its contacting edge is small, preferably between 5 and 15°. As shown, the impervious disks are pressed against the bearing face of the race by disk springs 12 and 13.

The diameter of each disk spring is so chosen as definitely to insure contact of the edge of each diaphragm with its bearing face and at the same time such that it will not itself engage the bearing face. This is accomplished by making the spring and the impervious disks of substantially the same diameter in each case.

Protective disks 14, 15 of felt or equivalent material are provided adjacent the spring disks 12, 13 and in turn these felt disks are pressed inward by spring disks 16, 17. The felt disks act as filters and serve to prevent any fine particles of metal or grit from engaging and damaging the diaphragms or the bearing face of the race. Accordingly, the felt disks are of a size to fit as closely as may be against the bearing faces. The felt presses inwardly against the bearing surfaces of the race in position radially outward beyond the impervious diaphragms and the springs 12, 13. The springs 16, 17 may be of large diameter to maintain the felt members pressed firmly against the race if desired. The springs 16, 17 acting through the felt members, reenforces the action of the springs 12, 13 to hold the impervious diaphragms in contact with the race.

The impervious diaphragms and the felt members are maintained in effective engagement with the race during rotation even during such movement as is caused by eccentricity of the shaft relative to the race and during such longitudinal movement or floating of the shaft relative to the casing as may occur due to bearing wear, provided the relative movement does not exceed that for which the seal is designed.

If desired the felt may be impregnated with a suitable lubricant such as water dispersed colloidal graphite or the like and also with water-repellent compound.

As a further protection in case the liquid on one side or the other of the seal may escape past the sealing diaphragm on that side, as may occur as the result of accident or after the seal is excessively worn, it is preferable to provide an absorbent and filtering felt member in the space between the two diaphragms and engaging both the race and the inner assembly rotatable with the shaft. In the structure shown an annular felt member 19 is fitted into an annular recess in the race and also into an annular recess in the central assembly. As a convenience for purposes of assembly the race 5 is formed with a separable part 20 threaded into the main body portion of the race. The felt member at its center engages between two spacing members 21, 22 of the central assembly. At either the outer or inner position of engagement or at both the felt member will be free to rotate in the channel provided for it. In order that the felt member may be sufficiently lubricated, it is preferably impregnated with a suitable lubricant such as water dispersed colloidal graphite.

In mounting the several annular members on the sleeve 6, it is necessary to insure an oil tight connection to prevent by-pass of oil. For this purpose the central apertures of the felt members are larger than the exterior diameter of the sleeve 6 and metal spacing rings 23, 24, and 25 are positioned between the felt members and the sleeve. The end of the sleeve is flanged to hold the parts as indicated at 26. A ring 27 is provided to protect the spring 17 during the flanging operation.

The proportions and arrangements are ordinarily, and preferably, such that the impervious diaphragms are convex or at least flat toward the bearing faces of the race, but this is not a necessary arrangement.

The foregoing particular description of structure and materials used is illustrative merely and is not intended as defining the limits of the invention.

I claim:

1. A fluid seal comprising, in combination, an annular race having oppositely disposed smooth bearing faces inclined to the plane of the member, a member concentric to said annular member and rotatable relative thereto, flexible impervious annular diaphragms carried by said concentric member and bearing at their free edges and rotatable against said smooth bearing faces and forming a slight angle therewith, means to press the edge of each diaphragm against the bearing face to provide a fluid tight sealing line engagement therebetween, the bearing faces of the race being concave toward the diaphragms and the diaphragms being convex toward the bearing faces and an absorbent felt annular member between the annular diaphragms and between and engaging both the race and the rotatable member.

2. A fluid seal comprising, in combination, an outer beveled annular member having oppositely disposed smooth bearing faces inclined to the plane of the member, an inner member rotatable relative to said outer member, flexible impervious annular diaphragms of organic material carried by said inner member, each presenting a convex face bearing at its outer edge against one smooth bearing face to provide a seal and rotatable thereagainst, said diaphragm being formed to present an annular sharp edge at one limit of the area of contact with the smooth bearing face and a felt member spanning the space between said outer and inner members and rotatable relative to and in contact with one member, substantially as and for the purpose described.

3. An oil seal comprising, in combination, an outer metal annular member having oppositely disposed smooth annular bearing faces, an inner rotor concentric to said annular member and rotatable relative thereto, flexible annular members of organic material impervious to oil carried by said rotor each bearing at its outer edge against one of said bearing faces at a slight angle thereto to provide substantially a line contact and rotatable thereagainst, means engaging said impervious annular members and pressing the same yieldably against said bearing faces and an absorbent member bridging the space between the outer annular member and said inner rotor, substantially as described.

4. A fluid seal comprising, in combination, an outer beveled annular race having oppositely disposed smooth bearing faces inclined to the plane of the member, an inner member rotatable relative to said outer member, flexible impervious annular diaphragms carried by said inner rotatable member one bearing at its outer edge against each bearing face and a felt member between said diaphragms and interengaging with both the race and the inner rotatable member.

5. A fluid seal comprising, in combination, an outer beveled annular race having oppositely disposed smooth bearing faces inclined to the plane of the member, an inner rotor concentric to said annular member and rotatable relative thereto, inner flexible impervious annular diaphragms carried by said rotor, one bearing at its outer edge against each bearing face and forming a slight angle therewith and rotatable thereagainst, means to press the outer edge of each diaphragm against said beveled annular member to provide a fluid tight sealing line engagement therebetween, the bearinge faces of the race being concave toward the diaphragms and the diaphragms being convex toward the said bearing face, and an absorbent felt annular member positioned in opposed recesses in the race and rotor between the diaphragms, substantially as and for the purpose described.

6. An oil seal comprising, in combination, an outer beveled annular race having oppositely disposed smooth bearing faces inclined to the plane of the race, inner flexible annular diaphragms impervious to oil engaging said bearing faces each having a convex face bearing at its outer edge against one bearing face and rotatable thereagainst to provide a sealing edge contact, a spring pressing each impervious flexible diaphragm against said one bearing face, an annular felt member of larger diameter than the adjacent diaphragm bearing against each spring, an annular spring member bearing against each said felt member and yieldably pressing the same toward the race, an incompressible ring of substantially the same thickness as and fitting within each felt member, a central mounting for said annular members and rings comprising a sleeve and means to clamp firmly the rings, the flexible members and the springs, substantially as described.

FURNESS HALL HATELY.